United States Patent [19]
DeGrenier

[11] Patent Number: 5,921,488
[45] Date of Patent: *Jul. 13, 1999

[54] PLIABLE THUMB PAD

[76] Inventor: Michael DeGrenier, 777 Annoreno Dr., Addison, Ill. 60101

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,014

[22] Filed: Oct. 20, 1995

[51] Int. Cl.⁶ .................................................. A01K 89/01
[52] U.S. Cl. ........................... 242/238; 242/239; 242/311
[58] Field of Search ................................. 242/238, 239, 242/240, 311, 283, 316; 264/273, 274

[56] References Cited

U.S. PATENT DOCUMENTS

| | | | |
|---|---|---|---|
| 3,591,996 | 7/1971 | Shanok et al. | 264/274 X |
| 4,154,413 | 5/1979 | Hull | 242/239 X |
| 4,830,306 | 5/1989 | Tsunoda et al. | 242/316 |
| 5,236,148 | 8/1993 | Valentine | 242/239 |
| 5,328,128 | 7/1994 | Morris | 242/283 |

FOREIGN PATENT DOCUMENTS 2120911  12/1983  United Kingdom ................... 242/240

*Primary Examiner*—Donald P. Walsh
*Assistant Examiner*—Emmanuel M. Marcelo
*Attorney, Agent, or Firm*—Sonnenschein Nath & Rosenthal

[57] ABSTRACT

A thumb pad for a fishing reel cushions the thumb of a user during repeated use. The fishing reel has a front cover, a back cover, a spool, and a spool engaging rod. The thumb pad includes a generally rectangular shell pivotally mounted within an opening in the back cover where the shell is formed from material having a first predetermined hardness. The shell has a generally sloping face portion and side portions depending from the face portion. The face portion of the shell includes a receiving portion for receiving a cushioning formation where the cushioning formation has a contour configured to receive the thumb of the user. The cushioning formation is integrally formed with the shell from material having a second predetermined hardness where the second predetermined hardness is substantially less hard than the first predetermined hardness to provide a soft surface against which the thumb of the user is placed.

9 Claims, 3 Drawing Sheets

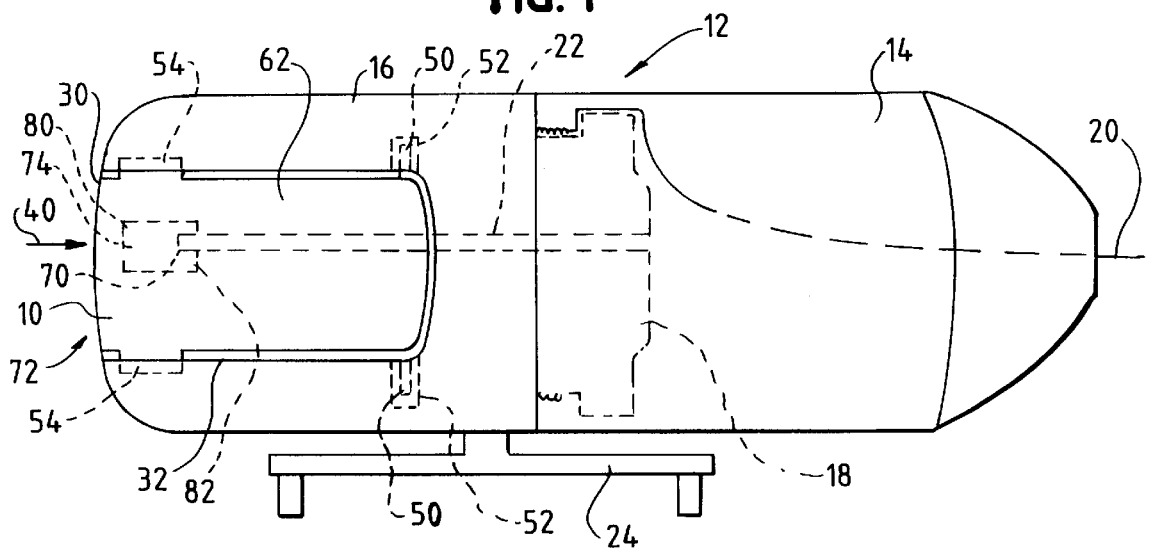
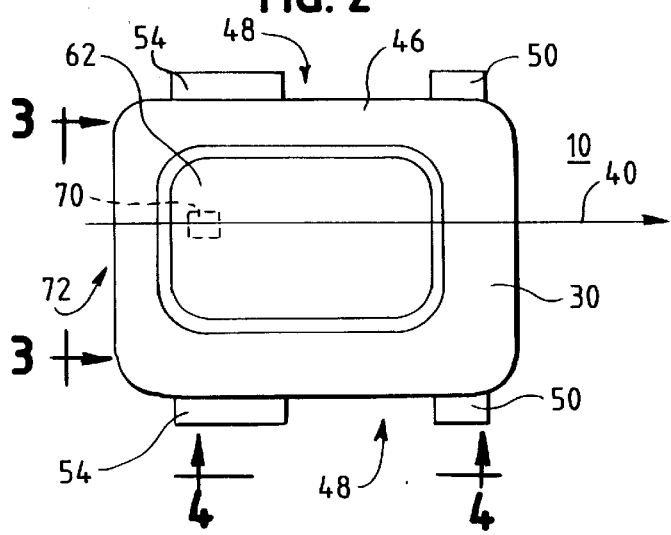
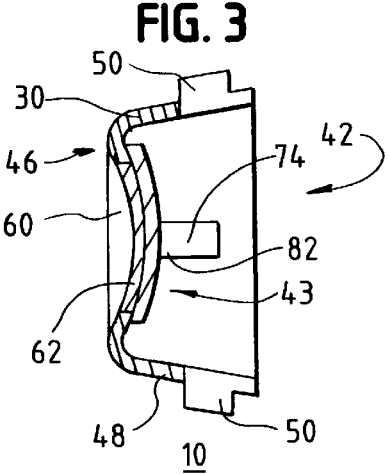
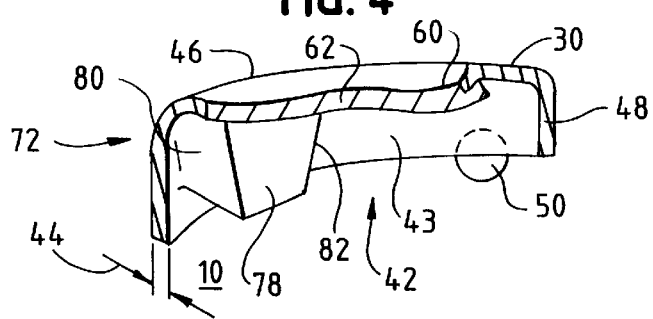

PLIABLE THUMB PAD

BACKGROUND OF THE INVENTION

The present invention relates generally to thumb pads and more specifically to a pliable, cushioned thumb pad disposed on a spin cast fishing reel.

Fishing is an extremely popular recreational sport enjoyed by millions of individuals. The basic components required to engage in the sport of fishing is a fishing rod and a fishing reel, both of which are manufactured in hundreds of varieties. One type of popular fishing reel is a spin cast reel. A spin cast reel is similar to a spinning reel in that it includes a circular spool around which a length of fishing line or monofilament is wound. However, a spin cast reel has a closed face. The spool is mounted transverse to the housing and includes a "bail" mechanism and a clutch which when depressed, "locks" the spool, and which when released, "unlocks" the spool to allow the fishing line to be released from the spool.

Known spin cast reels typically have a button or thumb stop mounted on the back end of the reel that is internally connected to the clutch mechanism. The user typically releases the bail by fully depressing the button. While the button is depressed, the spool is temporally locked and the fishing line cannot be unspooled. Next, the fishing rod is brought back behind the user and is rapidly cast forward to propel the bait in the direction of the cast. The user releases the button toward the end of the swing to impart maximum velocity to the bait. With the button released, the forward momentum of the bait draws the fishing line out of the spool. Once the bait is cast and lands in the water, the handle of the reel is then rotated approximately one-half of a revolution to lock the spool to prevent additional fishing line from exiting the spool.

The sport of fishing involves the repetitive operation of casting. In a typical day, a user may cast hundreds or even thousands of times. In known spin cast reels, the button is formed from hard material, such as from hard plastic, which may be similar to the material from which the reel housing is constructed. The user typically applies substantial pressure to the button, even if such substantial pressure is not actually required to engage the button. This is due to the manner in which the muscles of the hand and arm interact during the casting operation. Such repetitive pressure applied to the thumb over long periods of time may cause fatigue and may possibly cause soreness of the thumb. In some instances, repetitive stress injuries can occur. A need exists for a thumb pad or thumb stop that is padded with a cushioning material to reduce the stress on the user's thumb during the casting operation.

Accordingly, it is an object of the present invention to substantially overcome the above-described problems.

It is another object of the present invention to provide a cushioned thumb pad for a fishing reel to reduce thumb stress and thumb fatigue of the user.

It is a further object of the present invention to provide an aesthetically appealing fishing reel thumb pad used to engage and disengage the spool during casting.

SUMMARY OF THE INVENTION

The disadvantages of spin cast fishing reels are substantially overcome with the present invention by providing a novel thumb pad for a spin cast fishing reel.

More specifically, a fishing reel includes a thumb pad against which a thumb of a user is placed. The fishing reel has a front cover, a back cover, a spool, and a spool engaging rod. The thumb pad includes a generally rectangular shell pivotally mounted within an opening in the back cover where the shell is formed from material having a first predetermined hardness.

The shell has a generally sloping face portion and side portions depending from the face portion. The face portion of the shell includes a receiving portion for receiving a cushioning formation where the cushioning formation has a contour configured to receive the thumb of the user. The cushioning formation is integrally formed with the shell from material having a second predetermined hardness where the second predetermined hardness is substantially less hard than the first predetermined hardness to provide a soft surface against which the thumb of the user is placed.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 1 is a top plan view of a specific embodiment of a thumb pad mounted in a fishing reel, according to the present invention;

FIG. 2 is a top plan view of a specific embodiment of the thumb pad shown in FIG. 1;

FIG. 3 is an end view of a specific embodiment of the thumb pad shown in FIG. 1, taken along line 3—3 in the direction generally indicated;

FIG. 4 is a side sectional perspective view of a specific embodiment of the thumb pad shown in FIG. 1, taken along line 4—4 in the direction generally indicated;

DETAILED DESCRIPTION OF THE INVENTION

Figure 5:
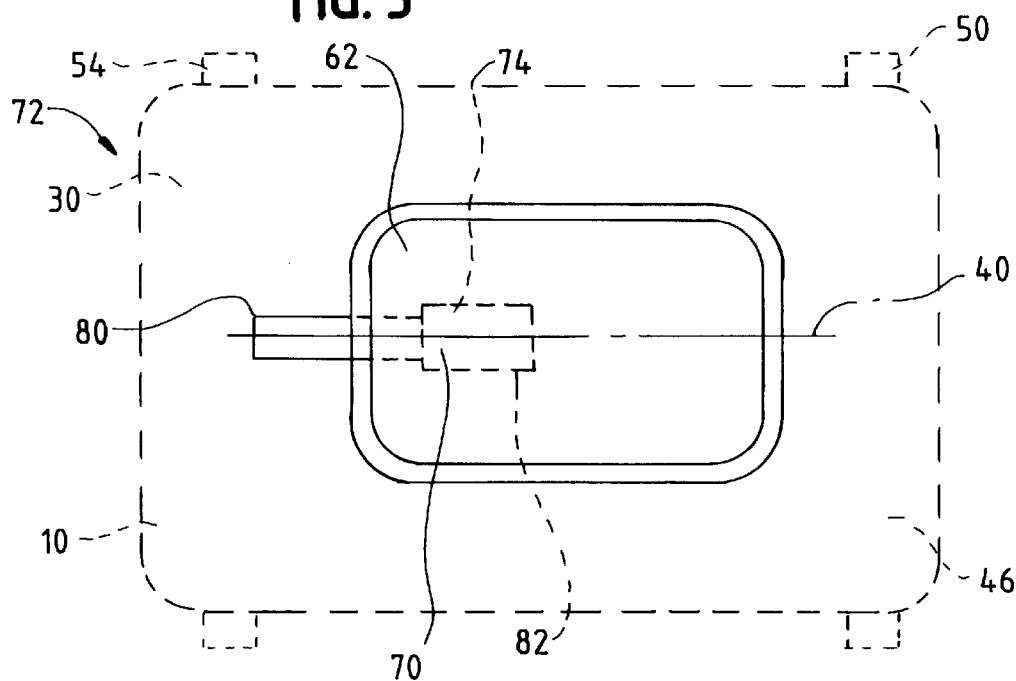
FIG. 5 is a top plan view of a specific embodiment of cushioning material of the thumb pad shown in FIG. 1.

Referring now to FIG. 1, a thumb pad 10 for a fishing reel 12 is shown generally. The fishing reel 12 includes a front cover 14, a back cover 16, a spool 18 for holding a coiled length of fishing line or monofilament 20, and a spool engaging rod 22. A gear mechanism (not shown) operatively connects the spool 18 and the spool engaging rod 22 to a handle 24, which when rotated, causes the fishing line 20 to be retrieved and coiled about the spool, as is known in the art. The front and back covers 14 and 16, for example, may be formed from high strength ABS plastic or similar material. However, any suitable hard plastic or metal may be used.

Referring now to FIGS. 1–4, the thumb pad 10 is formed as a generally rectangular shell 30 and is pivotally mounted within an opening 32 within the back cover 16. The shell 30 may be formed from high strength ABS plastic or similar hard plastic material, similar to the material from which the front and back covers 14 and 16 are formed. Such material is generally hard, rigid and durable. The shell 30 may be formed using suitable injection molding or heat molding techniques.

The shell 30 has a longitudinal axis 40 generally directed along the length of the fishing reel 12. The shell 30 is relatively thin and forms a hollow volume 42 that may be open on a bottom side 43. Preferably, the shell 30 has a generally sloping face portion 46 and side portions 48 depending from the face portion forming the hollow volume 42. The sloping face portion 46 provides an ergonomically suitable surface which facilitates user comfort when the thumb of the user is placed against the shell 30 for prolonged periods of time, as will be described in greater detail hereinafter.

The shell 30 includes pivot pins or ears 50 laterally projecting from the side portions 48 and integrally formed from the shell. A pair of bosses 52 integrally formed proximal to the opening 32 in the back cover 16 (FIG. 1) are configured to receive the pivot pins 50. This permits the shell 30 to pivot relative to the back cover 16 when pressure is applied to the shell by the thumb of the user during operation of the fishing reel 12.

A pair of stops 54 project laterally from the side portions 48 and are also integrally formed from the shell 30. The stops 54 are disposed rearward of the pivot pins 50 and are preferably enclosed within the back cover 16 to limit the degree of pivoting of the shell 30. Such pivoting permits the shell 30 to be displaced inwardly toward the interior of the back cover while the stops 54 prevent the shell from "popping-out" of the back cover.

The face portion 46 of the shell 30 includes a receiving portion 60 (FIGS. 3–4) for receiving a cushioning formation 62 where the cushioning formation conforms to the contour of the face portion. Such a contour provides an indentation configured to comfortably receive the thumb of the user. The cushioning formation 62 is well-suited for manufacture using known injection molding or other heat formation techniques and is integrally formed with the shell 30. The cushioning material 62 has a second predetermined hardness that is substantially less hard than the first predetermined hardness to provide a soft surface against which the thumb of the user is placed. The cushioning formation 62, for example, may be formed from polyester elastomers or other suitable soft material, such as rubber and hard foam. Such a suitable material may, for example, be manufactured under the trademark of SANIPRENE.

The cushioning formation 62 is relatively soft and substantially reduces fatigue of the user's thumb which is intermittently and repeatedly placed against the shell under substantial pressure during use of the fishing reel 12. Such an ergonomically correct thumb pad 10 increases user enjoyment and generally improves fishing technique since the user's thumb does not become fatigued after repeated casting.

Since the cushioning formation 62 is formed during a processing step separate from formation of the shell, the respective materials may be of a different color to increase aesthetic appeal. For example, the cushioning formation 62 may be formed from a brightly colored material or from a fluorescent material by simply adding an appropriate dye or coloring to the base plastic material. This eliminates the need to separately paint or color the cushioning formation 62 after manufacture and substantially reduces the cost of producing such a multi-colored thumb pad 10.

Referring now to FIGS. 1–5, an aperture 70 is disposed in the face portion 46 of the shell 30, preferably toward a distal end 72 of the shell, and is formed through the thickness 44 of the shell. The aperture 70 permits a portion of the cushioning formation 62 that is formed on the face portion 46 to also penetrate the shell 30 to form a rod engagement portion 74 on the bottom side 43 of the shell. The rod engaging portion 74 extends along the bottom side 43 of the shell 30 in a direction generally parallel to the longitudinal axis 40. The rod engaging portion 74 includes a distal reinforcing wall 80 for providing structural strength and a generally sloping engagement wall 82 opposite the reinforcing wall. However, the engagement wall 82 may also be flat or vertically oriented having no sloping contour.

Thus, the cushioning formation 62 is integrally formed on both the face portion 46 and the bottom side 43 of the shell 30. The portion of the cushioning formation 62 disposed on the face portion 46 forms the soft cushion for contacting the user's thumb while the portion of the cushioning formation 62 disposed on the bottom side 43 of the shell 30 forms the rod engaging portion 74.

The engagement wall 82 contacts the spool engaging rod 22 and causes the spool engaging rod to be reciprocally displaced when the shell 30 is pivotally displaced under thumb pressure. Although the rod engaging portion 74 and the engagement wall 82 are formed from material which is softer than the material from that of the shell 30, it is sufficiently hard to reciprocally engage and displace the spool engaging rod 22 without substantial deformation. Such reciprocal engagement and displacement of the spool engaging rod 22 causes the spool 18 to be locked and unlocked so the fishing line 20 can be retrieved and cast out, respectively, during operation of the fishing reel 12.

Figure 6:
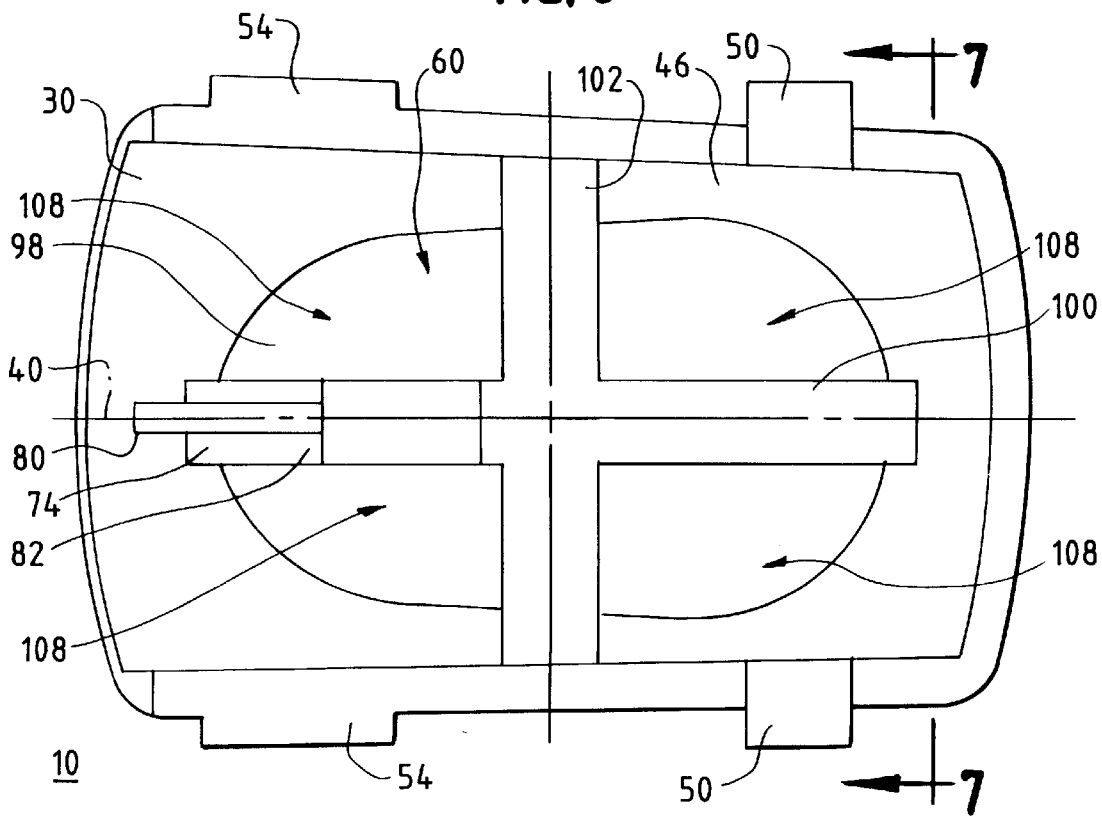
FIG. 6 is a top plan view of an alternate embodiment of a thumb pad mounted in a fishing reel, according to the present invention.
Figure 7:
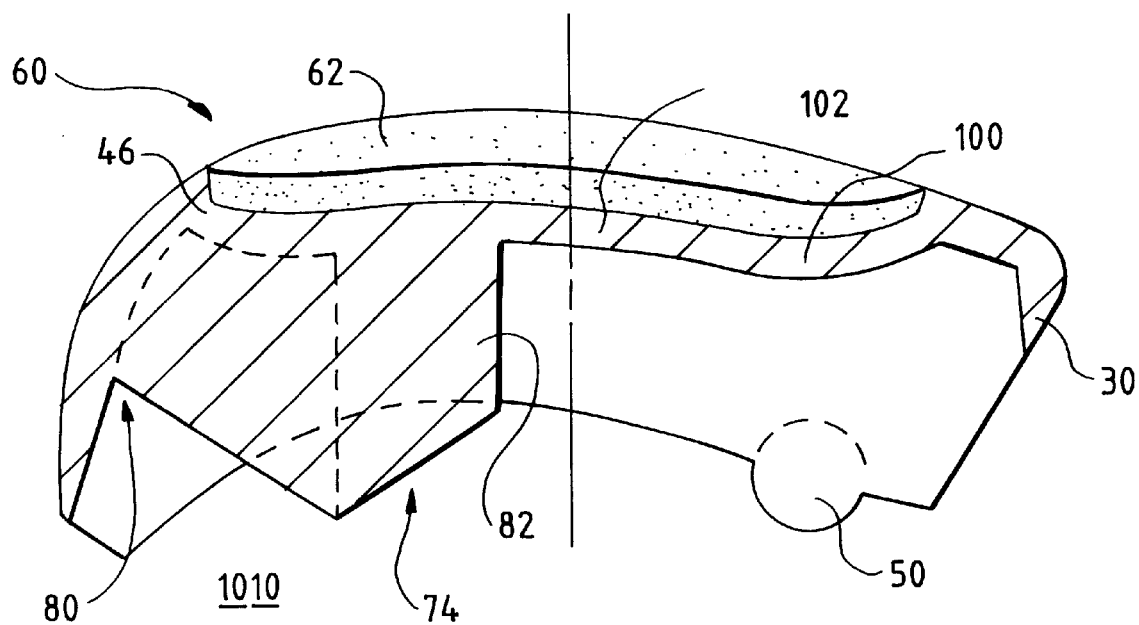
FIG. 7 is a side sectional perspective view of the thumb pad shown in FIG. 6, taken along line 7—7 in the direction generally indicated.

Referring now to FIGS. 1, 6 and 7, FIGS. 6 and 7 illustrate an alternate embodiment where the receiving portion 60 is essentially open defining an aperture 98 formed in the face portion 46 of the shell 30. A longitudinal support rib 100 and a transverse support rib 102 are integrally formed with the shell 30 and divide the receiving portion 60 into four quadrants 108 or smaller apertures. The support ribs 100 and 102 are configured to support the cushioning formation 62 and to provide surfaces to which the cushioning formation attaches.

However, any suitable number of support ribs 100 and 102 may be used and need not be geometrically oriented in a perpendicular configuration shown in the illustrated embodiment. For example, a single longitudinal support rib 100 may be used or a single transverse support rib 102 may be used. Alternately, three or more support ribs may be used which may or may not intersect.

The cushioning formation 62 is deposited on or around the support ribs 100 and 102 in a processing step subsequent to the processing step of forming the shell 30 and the support ribs. Structures within the molding apparatus (not shown) prevent the cushioning formation 62 from essentially "dripping" into the quadrants 108 formed between the support ribs 100 and 102. Thus, the cushioning formation 62, once applied, forms a layer on top of the support ribs 100 and 102 and may also form a layer of material around the support ribs so as to enclose all or a portion of the support ribs within the thickness of the cushioning formation.

In the illustrated embodiment, the rod engaging portion 74 is not integrally formed from the material from which the cushioning formation 62 is formed, as illustrated in FIGS. 1–4. Rather, the rod engaging portion 74 is integrally formed from the material from which the shell 30 and the support ribs 100 and 102 are formed and further, is formed in the same process step. Thus, the shell 30, the rod engaging portion 74 and the support ribs 100 and 102 are simultaneously formed during a first process step (not shown) while the cushioning formation 62 is applied during a second process step (not shown).

A specific embodiment of a novel thumb pad for a fishing reel according to the present invention has been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A thumb pad for a spin-casting fishing reel having a line control shell against which shell a thumb of a user is placed, the spin-casting fishing reel having a front cover, a back cover, a spool, and a spool engaging rod, the thumb pad comprising:

the shell pivotally mounted within an opening in the back cover, said shell formed from a material having a first predetermined hardness;

the shell having a generally sloping face portion and side portions depending therefrom;

the face portion of the shell having a receiving portion for receiving a cushioning formation, said cushioning formation having a contour configured to receive thumb of the user;

the cushioning formation integrally formed with the shell from a material having a second predetermined hardness, said second predetermined hardness being substantially less hard than the first predetermined hardness to provide a soft surface against which the thumb of the user is placed;

at least one aperture disposed in the shell to receive therethrough a portion of the cushioning formation and provide a means for the cushioning formation to attach such that a portion of the cushioning formation is integrally formed on said face portion and a portion thereof is formed on a bottom side of the shell, said portions being connected through the aperture and configured to conform to both the face portion and bottom side of the shell; and said cushioning formation disposed on said bottom side of the shell forming a rod engaging portion configured to reciprocally engage and displace the spool engaging rod when said shell is pivotally displaced.

2. The thumb pad according to claim 1 wherein the shell is formed from hard plastic material and the cushioning formation is formed from polyester elastomers.

3. The thumb pad according to claim 1 wherein the cushioning formation is formed from materials selected from the group consisting of rubber and hard foam.

4. The thumb pad according to claim 1 further including pivot pins laterally projecting from the side portions, and bosses integrally formed proximal to said opening in said back cover, said bosses configured to receive the pivot pins to permit the shell to pivot relative to the back cover, said pivoting causing the shell to reciprocally displace the spool engaging rod to reciprocally engage and release the spool.

5. The thumb pad according to claim 1 wherein the receiving portion of the shell includes at least one rib configured to support the cushioning formation and to provide surfaces to which the cushioning formation attaches, said cushioning formation covering top surfaces of the at least one support rib.

6. A thumb pad for a spin-casting fishing reel having a line control shell against which shell a thumb of a user is placed, the spin-casting fishing reel having a front cover, a back cover, a spool, and a spool engaging rod, the thumb pad comprising:

the shell pivotally mounted within an opening in the back cover, said shell formed from a material having a first predetermined hardness;

the shell having a generally sloping face portion and side portions depending therefrom;

the face portion of the shell having a receiving portion for receiving a cushioning formation, said cushioning formation having a contour configured to receive thumb of the user;

the cushioning formation integrally formed with the shell from a material having a second predetermined hardness, said second predetermined hardness being substantially less hard than the first predetermined hardness to provide a soft surface against which the thumb of the user is placed;

at least one aperture disposed in the shell to receive therethrough a portion of the cushioning formation and provide a means for the cushioning formation to attach such that a portion of the cushioning formation is integrally formed on said face portion and a portion thereof is formed on a bottom side of the shell, said portions being connected through the aperture.

7. A thumb pad as recited in claim 6 includes a spool engaging rod on the bottom side of said shell.

8. A thumb pad as recited in claim 7 further including at least one pivot pin laterally projecting from the side portions, and at least one boss integrally formed proximal to said opening in said back cover, said at least one boss configured to receive the at least one pivot pin to permit the shell to pivot relative to the back cover, said pivoting causing the shell to reciprocally displace the spool engaging rod which reciprocally engages and releases the spool.

9. The thumb pad according to claim 6 wherein the receiving portion of the shell includes at least one rib configured to support the cushioning formation, said cushioning formation covering top surfaces of the at least one support rib.

\* \* \* \* \*